United States Patent
Imatani et al.

(10) Patent No.: US 7,341,684 B2
(45) Date of Patent: Mar. 11, 2008

(54) COMPOSITE SYNTHETIC RESIN MATERIAL FORMING METHOD AND APPARATUS

(75) Inventors: Tsuneo Imatani, Yokohama (JP);
Makoto Etoh, Yokohama (JP);
Kazunobu Watanabe, Yokohama (JP);
Hotaka Fukabori, Yokohama (JP);
Ikuo Komatsu, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 111 days.

(21) Appl. No.: 10/543,211

(22) PCT Filed: Jan. 22, 2004

(86) PCT No.: PCT/JP2004/000530

§ 371 (c)(1),
(2), (4) Date: Jul. 22, 2005

(87) PCT Pub. No.: WO2004/065101

PCT Pub. Date: Aug. 5, 2004

(65) Prior Publication Data

US 2006/0051444 A1    Mar. 9, 2006

(30) Foreign Application Priority Data

Jan. 23, 2003   (JP)   ............... 2003-014472

(51) Int. Cl.
*B29C 47/06*    (2006.01)
*B29C 47/26*    (2006.01)

(52) U.S. Cl. .............. 264/171.1; 264/172.13; 264/172.15; 264/173.12; 264/173.16; 426/132; 426/133.1; 426/462

(58) Field of Classification Search ............... 425/132, 425/133.1, 381, 462, 466; 264/171.1, 172.13, 264/172.15, 173.12, 173.16
See application file for complete search history.

(56) References Cited

U.S. PATENT DOCUMENTS

| | | | | |
|---|---|---|---|---|
| 4,056,344 A | * | 11/1977 | Lemelson | .................... 425/132 |
| 4,906,421 A | * | 3/1990 | Plamthottam et al. | ...... 264/471 |
| 4,934,915 A | * | 6/1990 | Kudert et al. | ............... 425/132 |
| 5,104,305 A | * | 4/1992 | Kawaguchi et al. | ......... 425/130 |
| 5,162,121 A | * | 11/1992 | Kawaguchi et al. | ......... 425/130 |
| 5,350,211 A | | 9/1994 | Yada et al. | |
| 5,403,529 A | * | 4/1995 | Kawaguchi | .................. 264/167 |

FOREIGN PATENT DOCUMENTS

| | | |
|---|---|---|
| EP | 568823 A1 | 11/1993 |
| JP | 2001-88199 A | 4/2001 |

* cited by examiner

*Primary Examiner*—Tim Heitbrink
*Assistant Examiner*—Joseph Leyson
(74) *Attorney, Agent, or Firm*—Sughrue Mion, PLLC

(57) ABSTRACT

A composite synthetic resin material forming apparatus comprises an outer channel having an outer outlet, an inner channel having an inner outlet opening into the outer channel, outer synthetic resin supply means for flowing an outer synthetic resin through the outer channel, and inner synthetic resin supply means for flowing an inner synthetic resin through the inner channel. Opening and closing means for selectively opening and closing the inner outlet is disposed. The outer synthetic resin supply means intermittently supplies the outer synthetic resin to the outer channel in accordance with opening and closing of the inner outlet by the opening and closing means.

9 Claims, 4 Drawing Sheets

Fig. 3(iii)
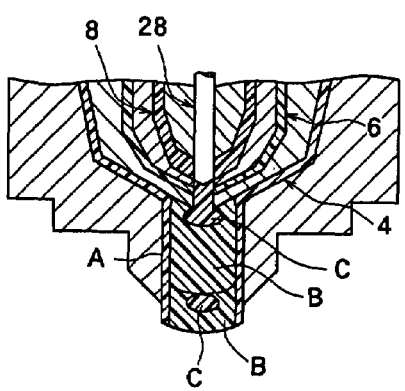

COMPOSITE SYNTHETIC RESIN MATERIAL FORMING METHOD AND APPARATUS

TECHNICAL FIELD

This invention relates to a composite synthetic resin material formation method and apparatus for forming a composite synthetic resin material including an outer synthetic resin layer, and at least one inner synthetic resin layer wrapped in the outer synthetic resin layer.

BACKGROUND ART

As well known among people skilled in the art, a composite synthetic resin material including an outer synthetic resin layer, and at least one inner synthetic resin layer wrapped in the outer synthetic resin layer is often used as a synthetic resin material for forming a preforming product (generally called a preform) to be blow molded into a beverage container, or for forming a container closure. Usually, a synthetic resin excellent in mechanical properties and hygienic properties is selected as the outer synthetic resin, while a synthetic resin excellent in gas barrier properties is selected as the inner synthetic resin.

Japanese Published Unexamined Patent Application No. Hei 1-195016 discloses a composite synthetic resin material forming apparatus comprising an outermost channel having an outermost outlet, an outer channel having an outer outlet opening into the outermost channel, an inner channel having an inner outlet opening into the outer channel, an outermost synthetic resin supply means for flowing an outermost synthetic resin through the outermost channel, an outer synthetic resin supply means for flowing an outer synthetic resin through the outer channel, and an inner synthetic resin supply means for flowing an inner synthetic resin through the inner channel. The inner outlet has an opening and closing means annexed thereto for selectively opening and closing the inner outlet. In accordance with the opening and closing of the inner outlet by the opening and closing means, the inner synthetic resin is intermittently flowed from the inner channel into the outermost channel via the outer channel. This inner synthetic resin is wrapped in the outermost synthetic resin directly flowed into the outermost channel, and the outer synthetic resin (the outer synthetic resin and the outermost synthetic resin may be the same synthetic resin) flowed into the outermost channel via the outer channel. As a result, a composite synthetic resin material is flowed out of the outermost outlet.

Japanese Published Unexamined Patent Application No. Hei 6-15715 also discloses a composite synthetic resin material forming apparatus comprising an outermost channel having an outermost outlet, an outer channel having an outer outlet opening into the outermost channel, an inner channel having an inner outlet opening into the outer channel, an outermost synthetic resin supply means for flowing an outermost synthetic resin through the outermost channel, an outer synthetic resin supply means for flowing an outer synthetic resin through the outer channel, and an inner synthetic resin supply means for flowing an inner synthetic resin through the inner channel. The outermost synthetic resin supply means is continuously operated to continuously flow the outermost synthetic resin directly into the outermost channel. The inner synthetic resin supply means is intermittently operated to intermittently flow the inner synthetic resin into the outermost channel via the outer channel. The outer synthetic resin supply means is intermittently operated a required time behind the intermittent operation of the inner synthetic resin supply means to intermittently flow the outer synthetic resin (the outer synthetic resin and the outermost synthetic resin may be the same synthetic resin) into the outer channel.

However, the composite synthetic resin material forming apparatus disclosed in the aforementioned Japanese Published Unexamined Patent Application No. Hei 1-195016 has the following problems to be solved: Particularly when the composite synthetic resin material is to be flowed out of the outermost outlet at a relatively high speed, the inner synthetic resin, which has been wrapped in the outermost synthetic resin and the outer synthetic resin, leaves a relatively long, thin trail in the flowing direction. Thus, the length, in the flowing direction, of a region where the inner synthetic resin is not present becomes markedly short. This makes it necessary to cut the composite synthetic resin in a markedly restricted region in the flowing direction of the composite synthetic resin, when cutting the composite synthetic resin, which has been discharged from the outermost outlet, in a direction perpendicular to the flowing direction to cut off the composite synthetic resin from the composite synthetic resin forming apparatus. Owing to a slight error in the cutting, therefore, it is highly likely that a defective composite synthetic resin material having the inner synthetic resin exposed at the cut surface will be formed.

In the composite synthetic resin material forming apparatus disclosed in the above-described Japanese Published Unexamined Patent Application No. Hei 6-15715, the outer synthetic resin is intermittently caused to inflow a predetermined time behind the intermittent inflow of the inner synthetic resin to pressurize the inner synthetic resin from the upstream side in the flowing direction, thereby shortening the length, in the flowing direction, of the inner synthetic resin so that the above problem with the composite synthetic resin material forming apparatus disclosed in the aforementioned Japanese Published Unexamined Patent Application No. Hei 1-195016 can be solved. However, the composite synthetic resin material forming apparatus disclosed in the above-described Japanese Published Unexamined Patent Application No. Hei 6-15715 is still not fully satisfactory. Particularly when the composite synthetic resin is flowed at a considerably high velocity, the phenomenon of the inner synthetic resin leaving a long trail is not sufficiently suppressed, partly because no opening and closing means is annexed to the inner outlet. Thus, a relatively long, thin trail of the inner synthetic resin tends to be generated.

DISCLOSURE OF THE INVENTION

It is a principal object of the present invention, therefore, to provide a novel and improved composite synthetic resin material forming method and apparatus which can sufficiently shorten the length, in the flowing direction, of the inner synthetic resin wrapped in the outer synthetic resin (or the outer synthetic resin and the outermost synthetic resin) even when the discharge speed of the composite synthetic resin is rendered fully high.

The inventors conducted in-depth studies, and have found that the above principal object can be attained by selectively opening and closing an inner outlet, and intermittently supplying an outer synthetic resin into an outer channel in accordance with the opening and closing of the inner outlet, in a composite synthetic resin material forming mode in which the outer synthetic resin is flowed through the outer channel having an outer outlet, and an inner synthetic resin is flowed through an inner channel having the inner outlet opening into the outer channel.

According to a first aspect of the present invention, there is provided, as a composite synthetic resin material forming method for attaining the above principal object, a composite synthetic resin material forming method arranged to flow an outer synthetic resin through an outer channel having an outer outlet, and flow an inner synthetic resin through an inner channel having an inner outlet opening into the outer channel, the method comprising:

selectively opening or closing the inner outlet; and intermittently supplying the outer synthetic resin into the outer channel in accordance with the opening or closing of the inner outlet.

Furthermore, it is preferred for the method to include flowing an outermost synthetic resin through an outermost channel having an outermost outlet, and the outer outlet preferably opens into the outermost channel.

According to a second aspect of the present invention, there is provided, as a composite synthetic resin material forming apparatus for attaining the above principal object, a composite synthetic resin material forming apparatus comprising:

an outer channel having an outer outlet;

an inner channel having an inner outlet opening into the outer channel;

an outer synthetic resin supply means for flowing an outer synthetic resin through the outer channel; and an inner synthetic resin supply means for flowing an inner synthetic resin through the inner channel, and further comprising an opening and closing means for selectively opening and closing the inner outlet, and wherein the outer synthetic resin supply means is intermittently operated in accordance with the opening and closing of the inner outlet by the opening and closing means to intermittently supply the outer synthetic resin into the outer channel.

Preferably, the outer synthetic resin supply means starts the supply of the outer synthetic resin simultaneously with or before the closing of the inner outlet by the opening and closing means, and stops the supply of the outer synthetic resin simultaneously with or before the opening of the inner outlet by the opening and closing means. Preferably, the inner synthetic resin supply means is continuously operated. In preferred embodiments, the composite synthetic resin material forming apparatus further comprises an outermost channel having an outermost outlet, and an outermost synthetic resin supply means for flowing an outermost synthetic resin through the outermost channel, and the outer outlet opens into the outermost channel. The outermost synthetic resin supply means may be operated continuously or intermittently. The outer synthetic resin supply means can be constructed of an extruder which is continuously operated, and a gear pump connected downwardly of the extruder and intermittently operated. Alternatively, the outer synthetic resin supply means can be constructed of an extruder which is continuously operated, two plunger means, and a switching means which is alternately set in a first state where the switching means brings one of the plunger means into communication with the extruder, and brings the other plunger means into communication with the outer channel, and a second state where the switching means brings the one of the plunger means into communication with the outer channel, and brings the other plunger means into communication with the extruder. The outer synthetic resin supply means can be constructed of an extruder which is continuously operated, and an intermittent communications means which intermittently brings the extruder into communication with the outer channel. A composite synthetic resin material to be formed may be compression molded into a preforming product (usually called a preform) which is, for example, blow molded later into a container.

BEST MODE FOR CARRYING OUT THE INVENTION

The preferred embodiments of the composite synthetic resin material forming method and apparatus constructed in accordance with the present invention will now be described in greater detail with reference to the accompanying drawings.

Figure 1:
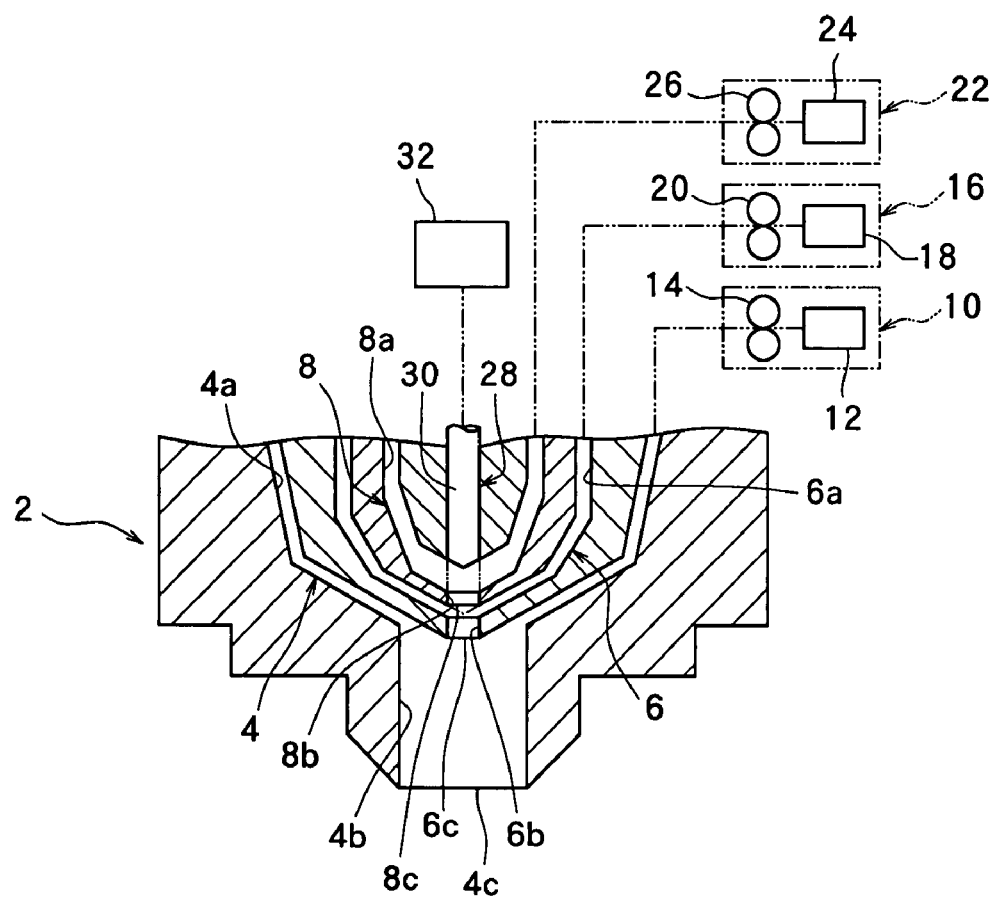
FIG. 1 is a partial sectional view showing a main portion of a preferred embodiment of the composite synthetic resin material forming apparatus constructed in accordance with the present invention.

FIG. 1 shows a main portion of the composite synthetic resin material forming apparatus constructed in accordance with the present invention. This apparatus has a nozzle means 2, only a tip portion of which is shown. In the nozzle means 2, which can be constructed by combining a plurality of members formable from a suitable metal, an outermost channel 4, an outer channel 6, and an inner channel 8 are formed. The outermost channel 4 includes an introduction portion 4a of an annular cross sectional shape, and a discharge portion 4b of a circular cross sectional shape. A downstream part of the introduction portion 4a extends toward a downstream side progressively obliquely in a radially inward direction, and the downstream end of the introduction portion 4a is connected to an upstream end peripheral edge portion of the discharge portion 4b. An outermost outlet 4c is formed at the downstream end of the discharge portion 4b. The outer channel 6 similarly includes an introduction portion 6a of an annular cross sectional shape, and a discharge portion 6b of a circular cross sectional shape. A downstream part of the introduction portion 6a extends toward a downstream side progressively obliquely in a radially inward direction, and the downstream end of the introduction portion 6a is connected to an upstream end peripheral edge portion of the discharge portion 6b. The discharge portion 6b is relatively short, and an outer outlet 6c is formed at the downstream end of the discharge portion 6b. The outer outlet 6c is open at the upper end center of the discharge portion 4b of the outermost channel 4. The inner channel 8 similarly includes an introduction portion 8a of an annular cross sectional shape, and a discharge portion 8b of a circular cross sectional shape. A downstream part of the introduction portion 8a extends toward a downstream side obliquely in a radially inward direction, and the downstream end of the introduction portion 8a is connected to the discharge portion 8b. The discharge portion 8b is relatively short, and an inner outlet 8c is formed at the downstream end of the discharge portion 8b. The inner outlet 8c is open at the upper end of the discharge portion 6b of the outer channel 6.

With further reference to FIG. 1, the upstream end of the outermost channel 4 is connected to an outermost synthetic resin supply means 10 via a suitable communication passage (not shown). The outermost synthetic resin supply means 10 includes an extruder 12, and a gear pump 14 connected downstream of the extruder 12, whereby an outermost synthetic resin A (FIGS. 3(i) to 3(vi)) in a molten state extruded from the extruder 12 is supplied to the outermost channel 4 via the gear pump 14. The upstream end of the outer channel 6 is connected to an outer synthetic resin supply means 16 via a suitable communication passage (not shown). The outer synthetic resin supply means 16 includes an extruder 18, and a gear pump 20 connected downstream of the extruder 18, whereby an outer synthetic resin B (FIGS. 3(i) to 3(vi)) in a molten state extruded from the extruder 18 is supplied to the outer channel 6 via the gear pump 20. The outermost synthetic resin A and the outer synthetic resin B may be the same synthetic resin, which is advantageously polyester, especially, polyethylene terephthalate. The upstream end of the inner channel 8 is connected to an inner synthetic resin supply means 22. The inner synthetic resin supply means 22 includes an extruder 24, and a gear pump 26 connected downstream of the extruder 24, whereby an inner synthetic resin C (FIGS. 3(i) to 3(vi)) in a molten state extruded from the extruder 24 is supplied to the inner channel 8 via the gear pump 26.

In the apparatus constructed in accordance with the present invention, it is important to dispose an opening and closing means 28 for selectively opening and closing the inner outlet 8c disposed at the downstream end of the inner channel 8. The opening and closing means 28 in the illustrated embodiment includes a rod 30 and an operating means 32. The rod 30 has substantially the same external diameter as the internal diameter of the discharge portion 8b of the inner channel 8, and has a front end portion of a conical shape. The operating means 32, which can be constructed of a cam mechanism or a fluid pressure cylinder mechanism, selectively locates the rod 28 at an open position indicated by solid lines, and a closed position indicated by dashed double-dotted lines. When the rod 28 is located at the open position, the inner outlet 8c disposed at the downstream end of the inner channel 8 is opened to bring the inner channel 8 into communication with the outer channel 6. When the rod 28 is located at the closed position, the inner outlet 8c disposed at the downstream end of the inner channel 8 is closed to block the inner channel 8 from the outer channel 6.

In the above-described apparatus, the outermost synthetic resin supply means 10 is preferably operated continuously (the extruder 12 is continuously operated, and the gear pump 14 is also continuously operated) to supply the outermost synthetic resin A continuously into the outermost channel 4. If desired, the outermost synthetic resin supply means 10 can be operated intermittently (the extruder 12 is continuously operated, but the gear pump 14 is intermittently operated). Advantageously, the inner synthetic resin supply means 22 is also continuously operated (the extruder 24 is continuously operated, and the gear pump 26 is also continuously operated), but it is important that the opening and closing means 28 annexed to the inner channel 8 is located alternately at the open position and the closed position. When the opening and closing means 28 is located at the open position, the inner synthetic resin C supplied from the inner synthetic resin supply mean 22 into the inner channel 8 is flowed into the discharge portion 4b of the outermost channel 4 via the discharge portion 6b of the outer channel 6. When the opening and closing means 28 is located at the closed position, the inner outlet 8c of the inner channel 8 is closed and, thus, the inner synthetic resin C does not flow into the discharge portion 6b of the outer channel 6. On the other hand, it is important that the outer synthetic resin supply means 16 is intermittently operated in accordance with the opening and closing of the opening and closing means 28 annexed to the inner channel 8 (the extruder 18 is continuously operated, but the gear pump 26 is intermittently operated). Preferably, the outer synthetic resin supply means 16 starts to be operated simultaneously with or prior to the closure of the inner outlet 8c by the locating of the opening and closing means 28 at the closed position, and the operation of the outer synthetic resin supply means 16 is stopped simultaneously with or prior to the opening of the inner outlet 8c by the locating of the opening and closing means 28 at the open position. The duration of the time that the opening and closing means 28 is located at the closed position to keep the inner outlet 8c closed is advantageously of the order of 1 to 4 times the time duration for which the opening and closing means 28 is located at the open position to keep the inner outlet 8c open.

If the outermost synthetic resin supply means 10 and/or the inner synthetic resin supply means 22 are or is continuously operated to supply synthetic resin continuously, the gear pump 14 and/or the gear pump 26 can be omitted if desired. To render the flow of the continuously supplied synthetic resin uniform and smooth, however, the gear pump 14 and/or the gear pump 26 should desirably be disposed.

Figure 2:
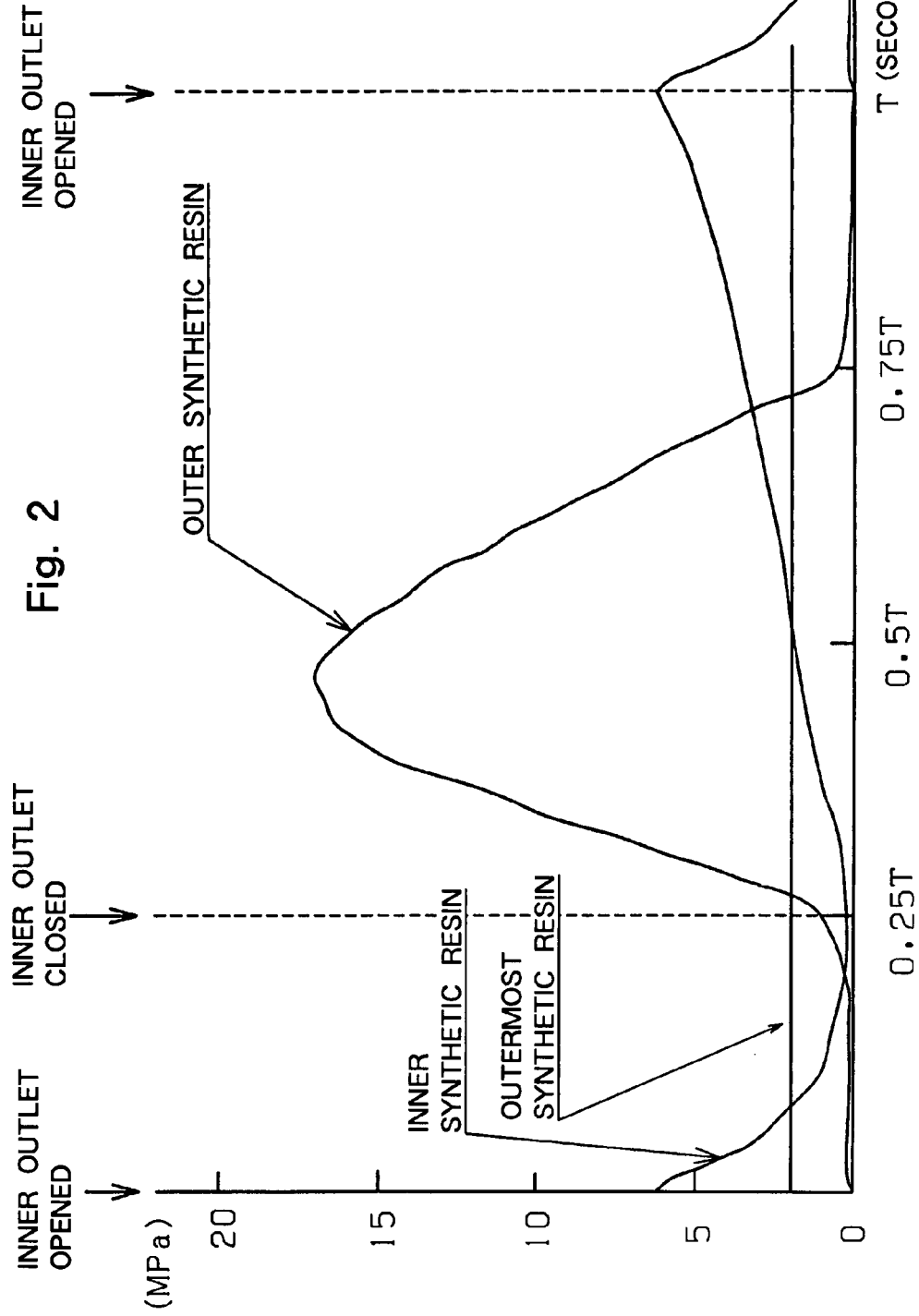
FIG. 2 is a diagrammatic view showing changes in the pressure of an outermost synthetic resin in an outermost channel, the pressure of an outer synthetic resin in an outer channel, and the pressure of an inner synthetic resin in an inner channel in the composite synthetic resin material forming apparatus of FIG. 1.
Figure 3I:
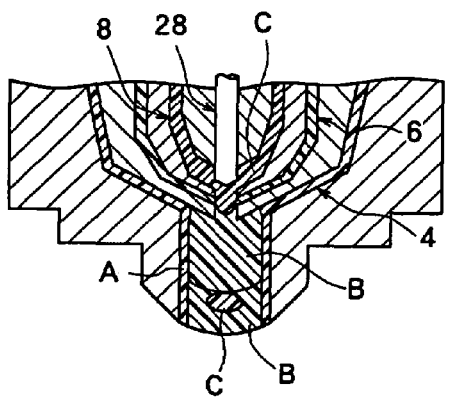
FIGS. 3(i) to 3(vi) are partial sectional views showing the states of the outermost synthetic resin, the outer synthetic resin, and the inner synthetic resin in the outermost channel, the outer channel, and the inner channel at various points in time in the composite synthetic resin material forming apparatus of FIG. 1.
Figure 3:
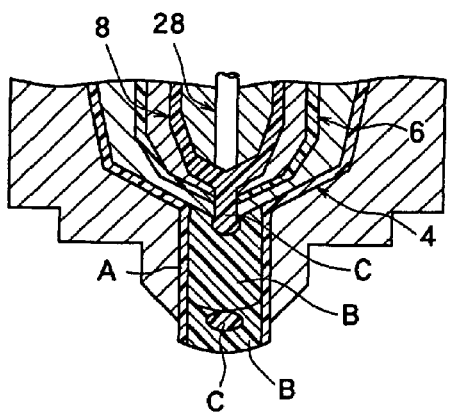
Figure 3:
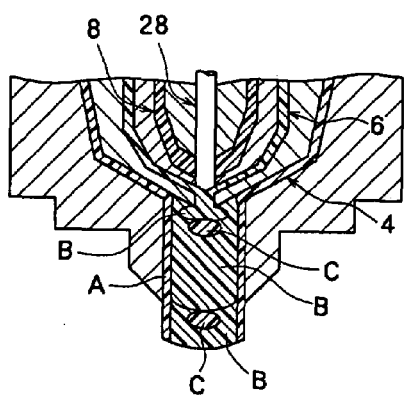
Figure 3V:
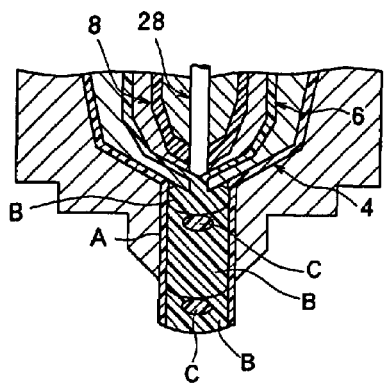
Figure 3:
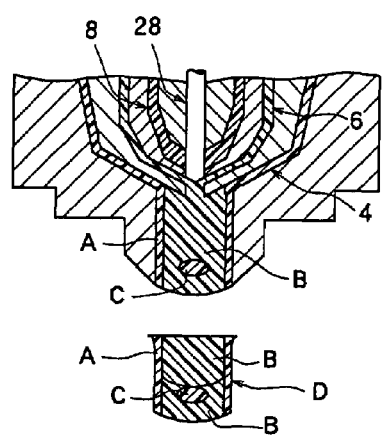

FIG. 2 shows changes, over time, in the pressure of the outermost synthetic resin A in the outermost channel 4, the pressure of the outer synthetic resin B in the outer channel 6, and the pressure of the inner synthetic resin C in the inner channel 8 in the preferred embodiment. FIGS. 3(i) to 3(vi) show the states of the outermost synthetic resin A, the outer synthetic resin B, and the inner synthetic resin C in the outermost channel 4, the outer channel 6, and the inner channel 8 at various points in time. With further reference to FIG. 2 and FIGS. 3(i) to 3(vi) along with FIG. 1, in the illustrated embodiment, the opening and closing means 28 is brought to the open position at a point in time 0.0T in FIG. 2, whereby the inner outlet 8c is opened. At this point in time, the outer synthetic resin supply means 16 is not in operation. When the opening and closing means 28 is brought to the open position to open the inner outlet 8c, the inner synthetic resin C is flowed from the inner channel 8 into the discharge portion 4b of the outermost channel 4 via the discharge portion 6b of the outer channel 6, as shown in FIGS. 3(i) and 3(ii). The outer synthetic resin B flowed from the outer channel 6 is present at the center of the discharge portion 4b of the outer channel 4, and the outermost synthetic resin A is present in a peripheral edge portion of the discharge portion 4b of the outermost channel 4. Thus, the inner synthetic resin C is flowed into the outer synthetic resin B.

At a point in time 0.25T in FIG. 2, the opening and closing means 28 is brought to the closed position to close the inner outlet 8c, as shown in FIG. 3(iii). Thus, inflow of the inner synthetic resin C from the inner channel 8 into the outer channel 6 and the outermost channel 4 is stopped. On the other hand, the outer synthetic resin supply means 16 starts to be operated slightly before the point in time 0.25T (or at the point in time 0.25T), and its operation is stopped at a point in time 0.75T. Thus, during the period from the start of operation to the stoppage of operation of the outer synthetic resin supply means 16, the pressure of the outer synthetic resin B in the outer channel 6 gradually increases and then gradually decreases. During the operation of the outer synthetic resin supply means 16, as will be understood by reference to FIGS. 3(iv), 3(v) and 3(vi), the outer synthetic resin B flows from the outer channel 6 into the discharge portion 4b of the outermost channel 4, acts on the upstream side of the inner synthetic resin C previously flowed into the outer synthetic resin B, and fluidizes the inner synthetic resin C gradually downstream while shortening the length, in the flowing direction, of the inner synthetic resin C. As a result, the inner synthetic resin C in the discharge portion 4b of the outermost channel 4 is positioned between the outer synthetic resin B caused to inflow previously and the outer synthetic resin B caused to inflow subsequently at a time interval. Consequently, a state is achieved in which the outer synthetic resin B exists over a considerable length between the inner synthetic resin C caused to inflow previously and the inner synthetic resin C caused to inflow subsequently at a time interval.

The inner synthetic resin supply means 22 is operated even while the opening and closing means 28 is kept at the closed position. Thus, during the period from locating of the opening and closing means 28 at the closed position until re-locating of the opening and closing means 28 at the open position, the pressure of the inner synthetic resin C in the inner channel 8 is gradually increased. When the opening and closing means 28 is brought to the open position at a point in time T, the inner synthetic resin C is flowed again from the inner channel 8 into the discharge portion 4b of the outermost channel 4 via the discharge portion 6b of the outer channel 6, and the pressure of the inner synthetic resin C in the inner channel 8 is gradually decreased. Since the outermost synthetic resin supply means 10 is continuously operated, the pressure of the outermost synthetic resin A in the outermost channel 4 is maintained at a substantially constant level.

A composite synthetic resin, consisting of the outermost synthetic resin A, the outer synthetic resin B and the inner synthetic resin C, which is flowed out of the outermost outlet 4c of the outermost channel 4, is cut at a site between two of the inner synthetic resins C to form a composite synthetic resin material D (FIG. 3(vi)). Cutting of the composite synthetic resin can be performed, for example, by a cutting member (not shown) which is moved across the outermost outlet 4c. In the resulting composite synthetic resin material D, the inner synthetic resin C is completely wrapped in the outer synthetic resin B and the outermost synthetic resin A, as will be clearly understood from FIG. 3(vi). In addition, the inner synthetic resin C tends to have an upstream side rendered somewhat concave under the action of the outer synthetic resin B. Thus, the composite synthetic resin material D can be used preferably as a composite synthetic resin material which is formed into a preform by compression molding.

In the illustrated preferred embodiment, the outermost channel 4 is also disposed in addition to the inner channel 8 and the outer channel 6. If desired, however, it is permissible to omit the outermost channel 4 and the outermost synthetic resin supply means 10 disposed in associated therewith. In this case, in order that the inner synthetic resin C is reliably wrapped in the outer synthetic resin B, it is advantageous that the discharge portion of the outer channel 6 is configured to have an upstream part of a relatively small diameter (corresponding to the discharge portion 6b of the outer channel 6 in FIG. 1) and a downstream part of a relatively large diameter (corresponding to the discharge portion 4b of the outermost channel 4 in FIG. 1). In the illustrated embodiment, moreover, a two-layer composite synthetic resin material is formed in which the inner synthetic resin C is wrapped in the outer synthetic resin B and the outermost synthetic resin A (the outer synthetic resin B and the outermost synthetic resin A may be the same). If desired, however, the present invention can be applied to the formation of a composite synthetic resin material of three or more layers in which the inner synthetic resin C itself has wrapped therein another layer or a plurality of other layers of synthetic resin. In this case, the relation between the flow of the inner synthetic resin C and the flow of the other synthetic resin wrapped therein can be rendered substantially the same as the relation between the flow of the outer synthetic resin B (and the outermost synthetic resin A) and the flow of the inner synthetic resin C in the illustrated embodiment.

Figure 4I:
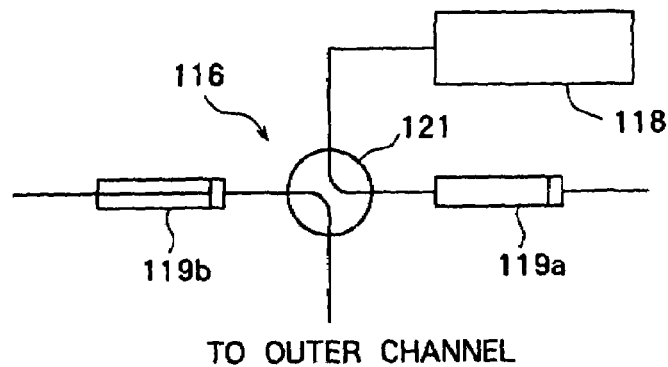
FIGS. 4(i) and 4(ii) are schematic views showing a modification of outer synthetic resin supply means.
Figure 4:
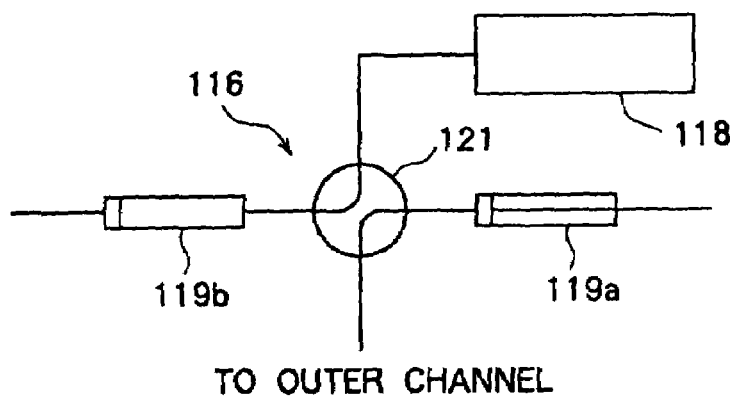

FIGS. 4(i) and 4(ii) show a modification of the outer synthetic resin supply means. This outer synthetic resin supply means 116 is constructed of an extruder 118, two plunger means 119a and 119b, and a switching means 121. The switching means 121, which can be constructed of a valve having two communication passages, is alternately set in a first state shown in FIG. 4(i) and a second state shown in FIG. 4(ii). When the switching means 121 is set in the first state shown in FIG. 4(i), the plunger 119a is in communication with the extruder 118, and synthetic resin extruded from the extruder 118 is accumulated in the plunger 119a. The plunger 119b is in communication with the outer channel 6 (FIG. 1) and, at a required point in time, a piston actuating means (not shown) is actuated to advance the piston of the plunger 119b (move it rightward in FIG. 4(i)), whereby the synthetic resin accumulated in the plunger 119b is supplied into the outer channel 6 (FIG. 1). When the switching means 121 is set in the second state shown in FIG. 4(ii), the plunger 119a is brought into communication with the outer channel 6 (FIG. 1) and, at a required point in time, a piston actuating means (not shown) is actuated to advance the piston of the plunger 119a (move it leftward in FIG. 4(ii)), whereby the synthetic resin accumulated in the plunger 119a is supplied into the outer channel 6 (FIG. 1). The plunger 119b is in communication with the extruder 118, and the synthetic resin extruded from the extruder 118 is accumulated in the plunger 119b. If desired, a gear pump can be disposed between the extruder 118 and the switching means 121 to render the flow of the synthetic resin toward the switching means 121 uniform and smooth.

Figure 5:
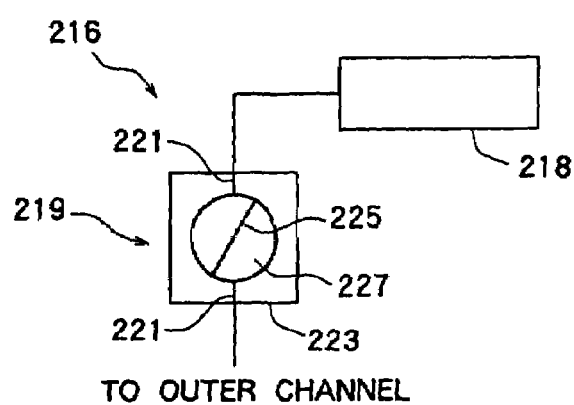
FIG. 5 is a schematic view showing still another modification of the outer synthetic resin supply means.

FIG. 5 shows still another embodiment of the outer synthetic resin supply means. The outer synthetic resin supply means 216 is constructed of an extruder 218, and an intermittent communication means 219 disposed downstream of the extruder 218. The intermittent communication means 219 is constructed of a stationary member 223, where a communication passage 221 is formed, and a rotary member 227 where a communication passage 225 is formed. The rotary member 227 is rotated continuously or intermittently and, when the communication passage 225 formed in the rotary member 227 is intermittently brought into communication with the communication passage 221 formed in the stationary member 223, synthetic resin extruded from the extruder 218 is supplied into the outer channel 6 (FIG. 1) through the communication passages 221 and 225. If desired, a gear pump can be disposed between the extruder 218 and the intermittent communication means 219 to render the flow of the synthetic resin toward the intermittent communication means 219 uniform and smooth.

What we claim is:

1. A composite synthetic resin material forming method arranged to flow an outer synthetic resin through an outer channel having an outer outlet, and flow an inner synthetic resin through an inner channel having an inner outlet opening into the outer channel, and comprising:

selectively opening and closing the inner outlet; and intermittently supplying the outer synthetic resin into the outer channel in accordance with opening and closing of the inner outlet, wherein the composite synthetic material includes an outer synthetic resin layer and an inner synthetic resin layer wrapped in the outer resin layer, and wherein the supplying of the outer synthetic resin is started simultaneously with or before the closing of the inner outlet, and the supplying of the outer synthetic resin is stopped simultaneously with or before the opening of the inner outlet.

2. The composite synthetic resin material forming method according to claim 1, further comprising flowing an outermost synthetic resin through an outermost channel having an outermost outlet, and wherein the outer outlet opens into the outermost channel.

3. A composite synthetic resin material forming apparatus comprising:

an outer channel having an outer outlet;

an inner channel having an inner outlet opening into the outer channel;

outer synthetic resin supply means for flowing an outer synthetic resin through the outer channel; and inner synthetic resin supply means for flowing an inner synthetic resin through the inner channel, and further comprising opening and closing means for selectively opening and closing the inner outlet, and wherein the outer synthetic resin supply means intermittently supplies the outer synthetic resin to the outer channel in accordance with opening and closing of the inner outlet by the opening and closing means, wherein the composite synthetic resin material includes an outer synthetic resin layer and an inner synthetic resin layer wrapped in the outer resin layer, and wherein the outer synthetic resin supply means starts supply of the outer synthetic resin simultaneously with or before the closing of the inner outlet by the opening and closing means, and stops the supply of the outer synthetic resin simultaneously with or before the opening of the inner outlet by the opening and closing means.

4. The composite synthetic resin material forming apparatus according to claim 3, wherein the inner synthetic resin supply means is continuously operated.

5. The composite synthetic resin material forming apparatus according to claim 3, further comprising an outermost channel having an outermost outlet, and outermost synthetic resin supply means for flowing an outermost synthetic resin through the outermost channel, and wherein the outer outlet opens into the outermost channel.

6. The composite synthetic resin material forming apparatus according to claim 5, wherein the outermost synthetic resin supply means is operated continuously or intermittently.

7. The composite synthetic resin material forming apparatus according to claim 3, wherein the outer synthetic resin supply means is constructed of an extruder which is continuously operated, and a gear pump connected downwardly of the extruder and intermittently operated.

8. The composite synthetic resin material forming apparatus according to claim 3, wherein the outer synthetic resin supply means is constructed of an extruder which is continuously operated, two plunger means, and switching means which is alternately set in a first state where the switching means brings one of the plunger means into communication with the extruder, and brings other of the plunger means into communication with the outer channel, and a second state where the switching means brings the one of the plunger means into communication with the outer channel, and brings the other of the plunger means into communication with the extruder.

9. The composite synthetic resin material forming apparatus according to claim 3, wherein the outer synthetic resin supply means is constructed of an extruder which is continuously operated, and intermittent communications means which intermittently brings the extruder into communication with the outer channel.

* * * * *